United States Patent
Uchman

(10) Patent No.: US 6,648,518 B2
(45) Date of Patent: Nov. 18, 2003

(54) CONSTANT VELOCITY JOINT ASSEMBLY WITH RETENTION MEMBER

(75) Inventor: Frederick J. Uchman, Clarkston, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 27 days.

(21) Appl. No.: 10/037,784

(22) Filed: Jan. 4, 2002

(65) Prior Publication Data

US 2002/0106140 A1 Aug. 8, 2002

Related U.S. Application Data

(60) Provisional application No. 60/267,269, filed on Feb. 8, 2001.

(51) Int. Cl.[7] .............................................. B60B 27/00
(52) U.S. Cl. ......................... 384/544; 384/589; 384/542
(58) Field of Search ................................. 384/589, 544, 384/542; 29/898.09, 898.07; 464/906, 145, 178, 182, 140, 15

(56) References Cited

U.S. PATENT DOCUMENTS

| | | | | |
|---|---|---|---|---|
| 2,136,125 A | * | 11/1938 | Delaval-Crow | 384/539 |
| 4,033,243 A | * | 7/1977 | Kirrish et al. | 411/338 |
| 4,602,876 A | * | 7/1986 | Miki et al. | 384/585 |
| 4,682,505 A | * | 7/1987 | Morissette et al. | 73/862.328 |
| 4,893,960 A | * | 1/1990 | Beier et al. | 403/24 |
| 5,115,746 A | * | 5/1992 | Scarpatetti | 104/245 |
| 5,209,701 A | * | 5/1993 | Ishikawa et al. | 464/178 |
| 5,261,273 A | * | 11/1993 | Imani et al. | 73/146.5 |
| 5,486,053 A | * | 1/1996 | Beagley et al. | 384/513 |
| 5,494,358 A | * | 2/1996 | Dougherty | 384/448 |
| 5,536,098 A | * | 7/1996 | Schwarzler | 403/259 |
| 5,549,514 A | * | 8/1996 | Welschof | 464/145 |
| 5,622,454 A | * | 4/1997 | Ashmore et al. | 405/259.5 |
| 5,762,559 A | * | 6/1998 | Jacob et al. | 464/145 |
| 5,942,890 A | * | 8/1999 | Reicks et al. | 324/173 |
| 5,950,785 A | * | 9/1999 | Adachi et al. | 192/69.41 |
| 6,012,986 A | * | 1/2000 | Guimbretiere | 464/178 |
| 6,127,819 A | * | 10/2000 | Ouchi | 324/173 |
| 6,139,216 A | * | 10/2000 | Bertetti | 403/359.3 |
| 6,146,022 A | * | 11/2000 | Sahashi et al. | 384/544 |
| 6,193,419 B1 | | 2/2001 | Krude et al. | |
| 6,273,825 B1 | * | 8/2001 | Schwarzler et al. | 464/139 |
| 6,354,952 B1 | * | 3/2002 | Boulton et al. | 464/145 |

FOREIGN PATENT DOCUMENTS

WO        WO 99/13232        3/1999

* cited by examiner

*Primary Examiner*—William C Joyce
*Assistant Examiner*—Julie K. Smith
(74) *Attorney, Agent, or Firm*—Mick A. Nylander

(57) ABSTRACT

An assembly including an outer race of a constant velocity joint and part of a vehicle wheel bearing sealed by a sealing member. The outer race has a first bore defining a neck portion having an interior surface including an annular wall. The wheel bearing part has a second bore with an open end and a flange. The second bore defines a central passage and the flange engages the interior surface of the neck portion. The engaged portion is sealed by a sealing member including a body sealingly engaging the central passage and a diaphragm attached to the body sealingly engaging the annular wall. In one aspect of the invention, the sealing member body includes a cylindrical body having an annular groove formed therein containing a seal for sealingly engaging the central passage. In another aspect of the invention, the interior surface includes an annular ridge and the diaphragm includes a curved portion engaging the annular wall and the annular ridge.

19 Claims, 3 Drawing Sheets

CONSTANT VELOCITY JOINT ASSEMBLY WITH RETENTION MEMBER

CROSS REFERENCE TO RELATED APPLICATION

This application claims the benefit of U.S. Provisional Application Ser. No. 60/267,269 filed on Feb. 8, 2001 entitled "CVJ With Bolted Retention."

TECHNICAL FIELD

This invention relates generally to the securing together against relative axial movement of two members in telescopic relation. In particular, the invention relates to securing together the outer race of a constant velocity joint and part of a motor vehicle wheel bearing as well as a device for sealing the interface between the outer race and wheel bearing part.

BACKGROUND OF THE INVENTION

Various proposals have been made for securing together the outer race of a constant velocity joint and part of a motor vehicle wheel bearing. For example, U.S. Pat. No. 6,193,419 issued Feb. 27, 2001 to GKN Automotive AG and publication WO99/13232 in the name of GKN Automotive AG disclose a spring ring acting in grooves formed in the CV joint outer race external member and wheel bearing part internal member to prevent the separation of the two parts from one another. Spring ring mechanisms for securing members together have assembly and disassembly disadvantages. For example, the manufacturing tolerances associated with the splined internal and external members must be such that the two members can readily telescope with respect to each other for assembly purposes when a spring ring is used. As a result, some lash may be introduced into the assembly. Further, the area around the exterior of the wheel bearing is very confined and there is little space to manipulate the spring ring. Accordingly, there is a need for an alternative mechanism for securing together the outer race of a constant velocity joint and part of a motor vehicle wheel bearing.

SUMMARY OF THE INVENTION

According to an embodiment of the present invention, an improved CV joint and wheel hub assembly having a retention mechanism is provided. The assembly includes an outer race of a constant velocity joint and part of a vehicle wheel bearing. The outer race has a first bore defining a neck portion having an interior surface including an annular wall. The wheel bearing part has a second bore with an open end and a flange. The second bore defines a central passage and the flange engages the interior surface of the neck portion. The engaged portion is sealed by a sealing member including a body sealingly engaging the central passage and a diaphragm attached to the body sealingly engaging the annular wall. In one aspect of the invention, the sealing member body includes a cylindrical body having an annular groove formed therein containing a seal for sealingly engaging the central passage. In another aspect of the invention, the interior surface includes an annular ridge and the diaphragm includes a curved portion engaging the annular wall and the annular ridge.

In another embodiment, a method of securing together the outer race of the constant velocity joint and part of a wheel bearing by the sealing member is provided. The method includes sealingly engaging the body of the sealing member within the central passage of the bore of the wheel bearing part. The sealing member diaphragm engages the interior surface of the outer race neck portion which is telescoped over the flange of the wheel bearing part. The diaphragm and sealing member body are then engaged with a fastener and tightened to draw together the neck portion and the flange.

One advantage of the present invention is that it sealingly engages the outer joint part of the CV joint with the wheel bearing part. Another advantage is that it allows for the inter-engaging splines to be manufactured in a manner to reduce lash since the retention mechanism can be used to draw the outer part of the constant velocity joint and the wheel bearing part together. A further advantage of the present invention is that it provides serviceability of the assembly from the wheel end while it is installed on a vehicle.

Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
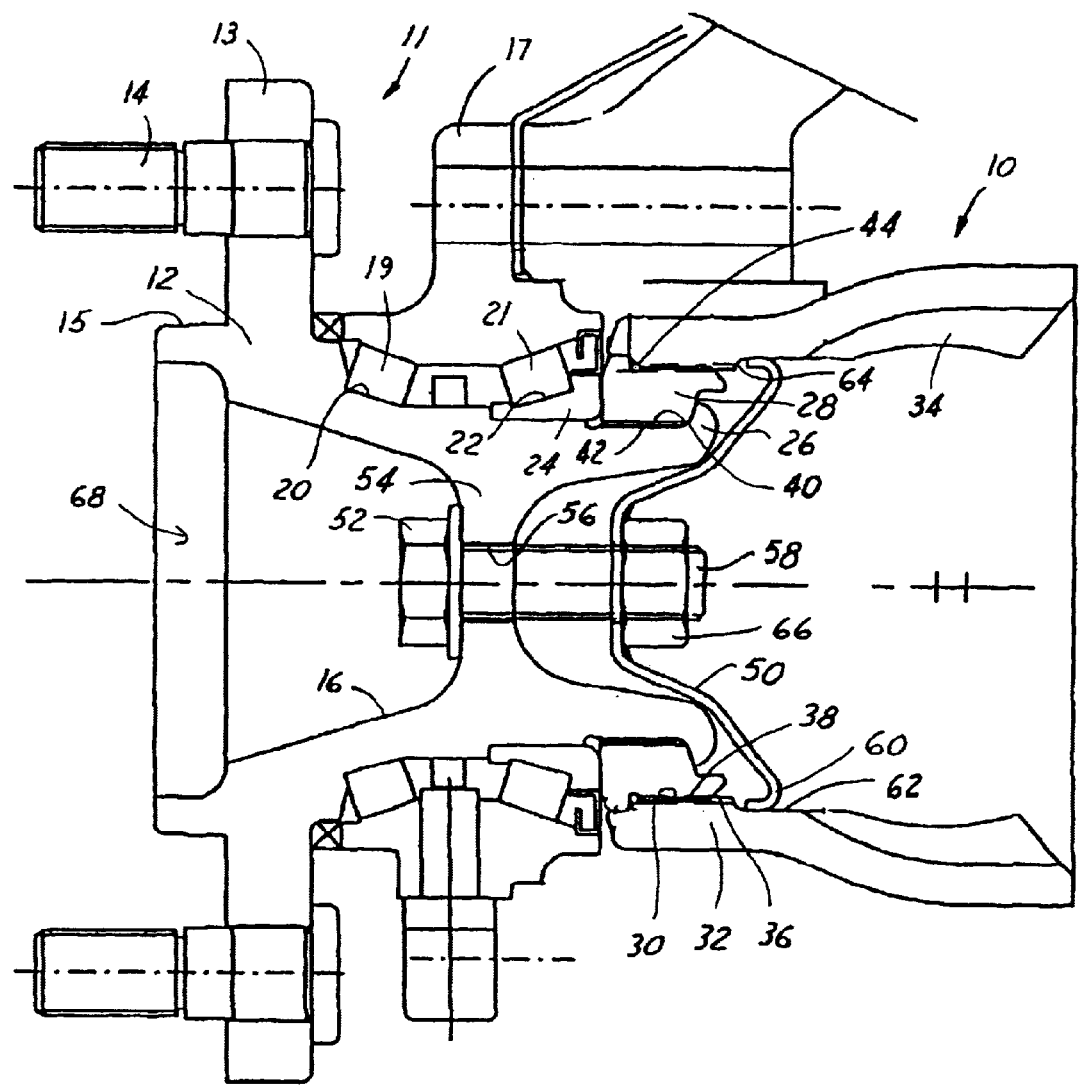
FIG. 1 is a vertical cross-section through a wheel bearing part and outer race of a constant velocity joint assembly according to a first embodiment of the present invention.

Referring now to FIG. 1, there is shown an assembly of an outer race 10 of a constant velocity joint and a motor vehicle wheel bearing assembly indicated generally at 11. The wheel bearing assembly 11 includes a hub 12 having a flange 13 which carries bolts 14 to receive a vehicle road wheel (not shown) which is located on a spigot 15. The hub 12 includes a bore 16 and is rotatably mounted in a fixed part 17 which may be connected by bolts (not shown) to a suspension knuckle of a vehicle. There is a rolling element bearing 19 between the hub 12 and the fixed part 17. In the example shown in FIG. 1, the bearing is a double rolling bearing, but may be a double-ball bearing or a single rolling bearing. The outer races of the bearing are formed in the fixed part 17. The inner race of one of the bearing rows is indicated at 20 and is formed on the hub 12. The inner race of the other bearing row is indicated at 22 and is formed on a separate inner race 24. The hub 12, at its right end, has an outwardly swaged portion 26. The swaged portion 26 engages the right end of a securing ring 28 which engages the race ring 24. In this way, the swaged portion 26 acts to preload the bearing 21 between the hub 12 and the fixed portion 17 by preloading the separate race ring 24.

The outer race 10 of the constant velocity joint has ball tracks 34 as well as the tubular neck portion 32 which is internally splined at 36. The splines 36 in the neck portion 32 of the outer race 10 engage the splines 38 on the external surface 30 of the securing ring 28. The outer race 10 is part of a constant velocity joint which will also include an inner race, cage and balls (not shown).

The securing ring 28 further includes splines 40 about its interior surface which engage splines 42 on the right end of the hub 12 near the swaged portion 26. Between the securing ring 28 and neck portion 32 of the outer race 10, there is included a seal 44 such as an o-ring.

Figure 3:
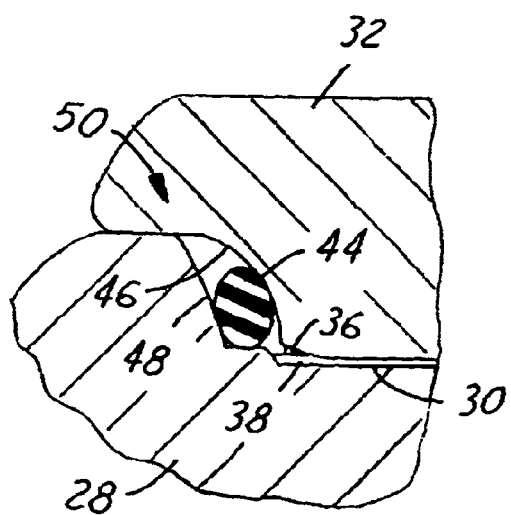
FIG. 3 is a detailed view of the sealing ring used in the assembly of the present invention.

Referring now to FIG. 3, there is shown a detailed sectional view of the seal 44 between the neck portion 32 of the outer race 10 and the securing ring 28. The inter-engaging splines 36, 38 of the outer race and securing ring, respectively, are also shown. As can be seen in FIG. 3, the seal 44 is preferably located between a curved end face 46 of the outer race 10 and a raised annular portion 48 of the securing ring 28. Alternatively, the end face 46 and raised annular portion 48 can both be vertical with the seal 44 engaged therebetween. The overlap between the end face 46 and raised annular portion 48 in the region 50 as shown in FIG. 3, however, provides a preferred seal between the securing ring 28 and outer race 10 to prevent impurities from compromising the splined connection therebetween.

Referring again to FIG. 1, the splined connection between the securing ring 28 and neck portion 32 of the outer race 10 is further protected and sealed by a diaphragm 50 and a sealing member 52 sealingly engaging the flange 54 and central passage 56 within the bore 16 of the hub 12. The sealing member 52 seals the central passage 56 from contaminants communicated through the open end 68 of the hub 12 in the bore 16. The diaphragm 50 is fixedly attached to the body 58 of the sealing member 52 and includes an annular curved portion 60 for engaging an interior wall 62 of the outer race 10 as well as an inner annular ridge 64 of inner race 10. In the example shown in FIG. 1, the diaphragm 50 is attached to the body 58 of sealing member 52 by way of a nut 66 which is welded to the diaphragm. The diaphragm 50 could also be free-floating with respect to the fastener 66 on the body 58 of the sealing member 52. The sealing member 52 is shown as a bolt which passes through a central passage 56 and cooperates with the nut 66 to pull the diaphragm 50 towards the opening 68 within the hub 12.

In operation, as the diaphragm 50 is drawn towards the opening 68, the annular curved portion 60 at its end engages the inner ridge 64 and draws the outer race 10 over the securing ring 28 towards the hub 12. Because the diaphragm 50 can be used to draw the outer race of the constant velocity joint toward the bearing hub assembly, the splined connection at 36, 38 can be designed with interference to reduce lash in the connection. The cooperation of the annular curved portion 60 with the interior wall 62 also provides a seal for the splined connection between the outer race 10 and the securing ring 28. In addition, because the sealing member 52 is a bolt, the entire assembly can be readily serviced from the wheel end 68 by simply removing the bolt 52. Alternatively, the bolt can be welded to the diaphragm 50 and a flange nut can be used to pull the bolt and diaphragm assembly towards the opening 68 in the hub 12.

Figure 2:
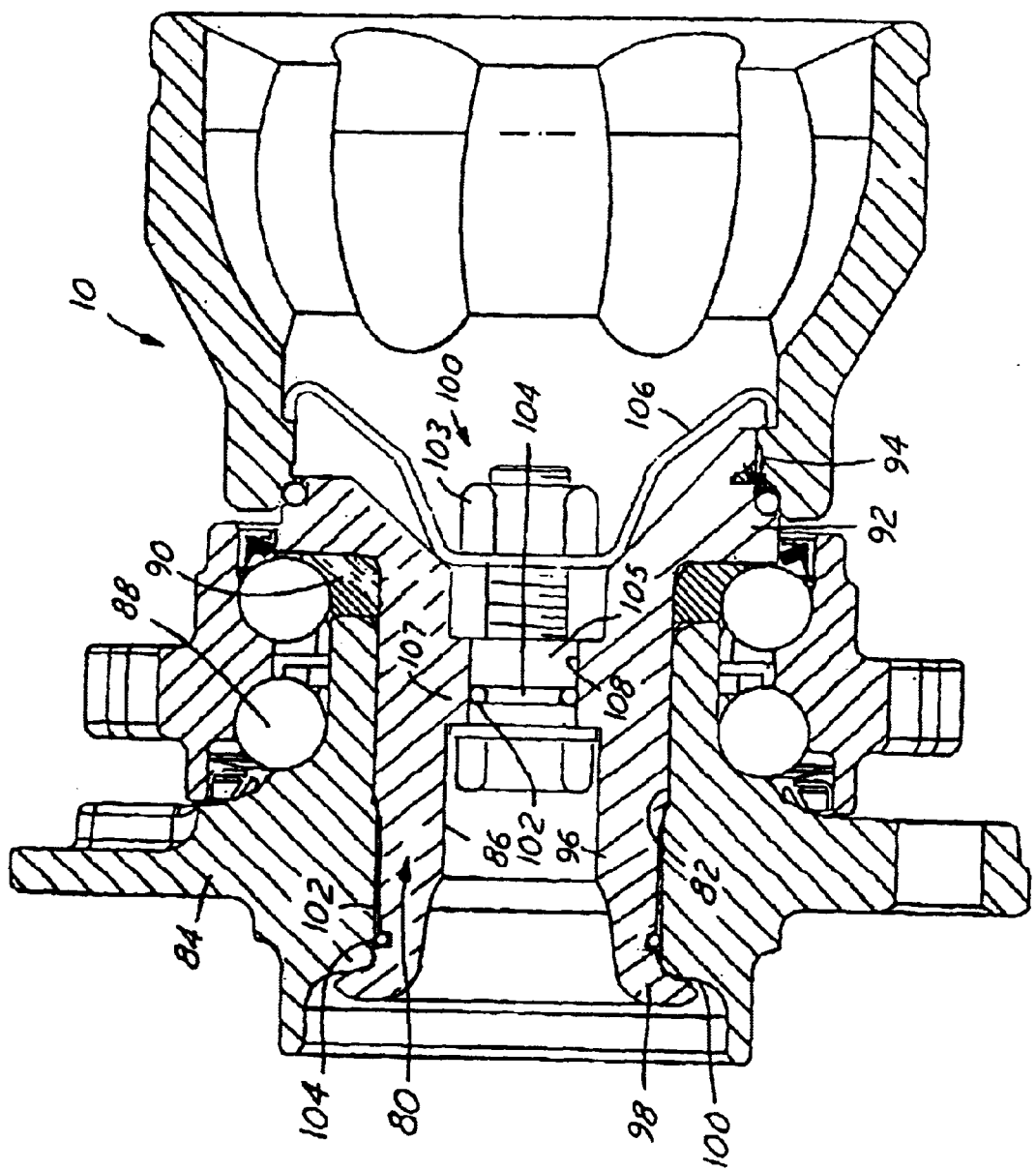
FIG. 2 is a vertical cross-section through a wheel bearing part and outer race of a constant velocity joint assembly according to another embodiment of the present invention.

Referring now to FIG. 2, there is shown a vertical cross section through a wheel bearing and outer race of a constant velocity joint assembly according to another embodiment of the invention. FIG. 2 differs from FIG. 1 in that a tubular securing element 80 is located within the bore 82 of the hub 84. The tubular securing element 80 also has a bore 86 and serves to preload the bearing 88 by way of the race ring 90.

At the right end in FIG. 2, the securing element 80 has a flange 92, the outer surface of which is splined at 94 to engage the splines of the neck portion of the outer race 10. Although the race ring 90 is shown as a separate member located on a seat on the flange 92, the race ring 90 can be formed as an integral part of the securing element 80 rather than a separate piece. In either event, however, the tubular part 96 of the securing element 80 passes through the bore 82 of the hub 84 and at its left end is swaged outwardly at 98 to engage the surface 100 on the hub 84. As the swaging takes place, a load is applied to the securing element 80 so that it loads the bearing race 90 and thus preloads the bearing 88. The bore 82 of the hub 84 and the tubular part 96 of the securing element 80 have inter-engaging splines 102. An annular seal 104 may be included in the securing element 80 such as an o-ring seal to prohibit contaminants from contacting the inner engaging splines 102.

The bore 86 of the securing element 80 includes an internal flange 107 which provides a central passage 108 in which the sealing member 100 is received to secure the diaphragm 106 as described above with reference to FIG. 1.

The sealing member 100 of FIG. 2 differs from the sealing member 52 of FIG. 1 in that it includes a seal 102 within an annular groove 104 in the body 105 carried on the member 100. The seal 102 cooperates with the central passage 108 within the bore 86 of the securing member 80 to seal the passage. The diaphragm 106 is the same as the diaphragm shown on the sealing member 52 of FIG. 1. The body portion 105 may be fixed on the member 100, threaded thereto, or free-floating thereon. The body may be advantageously made of plastic, the seal made of rubber, and the diaphragm made of metal or plastic.

In operation, the body of the member 100 is pushed into the central passage to sealingly engage the passage with the seal portion 105 of the member 100. The fastener 103 then engages the body of the member 100 is tightened to draw the diaphragm 106 towards the open end at the left end of the hub. As a result, the outer race 10 is engaged by the curved portion of the diaphragm and drawn towards the hub flange or securing ring as described above. The diaphragm 106 may be attached to the fastener 103, or may be free-floating on the body of the member 100 as before.

Figure 4:
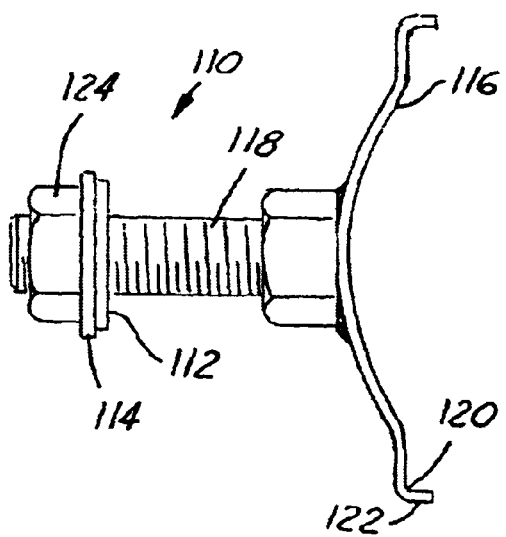
FIG. 4 is a side view of an alternative embodiment of a sealing member and diaphragm for use in the assembly of FIGS. 1 or 2.

Referring now to FIG. 4 there is shown an alternative embodiment of the sealing member. In this example, the sealing member 110 includes a seal 112 cooperating between the flange 114 and the face of the flange forming the central passage within the hub. The diaphragm 116 also is fixedly attached to the body of the sealing member 110. The body 118 can be a bolt with the diaphragm 116 welded to the head of the bolt. The curved portion 120 of the diaphragm 116 forms an annular surface 122 which engages the inner annular surface of the outer race to seal the splined connection between the outer race and flange of the hub or securing ring. The seal 112 can be made of any resilient material such as plastic or rubber, and the diaphragm 116 can made of plastic or metal, for example.

In operation, the body 118 of the securing member 110 is passed through the central passage and the threaded fastener 124 with the seal 114 is fastened thereto. As the fastener is tightened, the diaphragm 116 is drawn towards the wheel end of the hub. The curved portion 120 of the diaphragm 116 engages the inner annular ridge of the outer race, and the annular surface 122 sealingly engages the inner annular surface of the outer race to seal the splined connection between the outer race and hub.

Numerous alternative embodiments for the sealing member are also contemplated by the present invention. Thus, the sealing member may engage and seal the central passage by threaded engagement, a seal such as seal 104 or seal 112, by interfacing between the flange 114 and the flange forming the central passage, or by simply being interference within the passage. For these purposes, the sealing member may be advantageously made of plastic or metal, and either threaded or unthreaded. The fastening mechanism connecting the diaphragm to the body of the sealing member may also be different without departing from the scope of the present invention. Thus, a ratchet and prawl connection, or threaded connection may be used, for example. The diaphragm, as mentioned above, may also be connected to the body or fastener, or free-floating thereon. In the case where the diaphragm is attached to the fastening mechanism directly, it may be stud welded or brazed thereon, for example.

From the foregoing, it can be seen that there has been brought to the art a new and improved method of securing together the outer race of a constant velocity joint and part of a motor vehicle wheel bearing as well as a device for sealing the interface between the outer race and wheel bearing part. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An assembly comprising an outer race of a constant velocity joint and part of a vehicle wheel bearing, wherein the outer race has a first bore defining a neck portion having an interior surface including an annular wall, and wherein the wheel bearing part has a second bore with an open end and a flange, the second bore defining a central passage and the flange engaging the interior surface of said neck portion, the engaged portion being sealed by a sealing member comprising a body sealingly engaging said central passage and a diaphragm attached to said body said diaphragm including a rolled annular edge sealingly engaging said annular wall.

2. An assembly according to claim 1, wherein said sealing member body comprises a cylindrical body having an annular groove formed therein, said groove containing a seal for sealingly engaging said central passage.

3. An assembly according to claim 1 wherein said sealing member body comprises a threaded bolt and said central passage includes threads for engaging said bolt.

4. An assembly according to claim 1 wherein said sealing member comprises a bolt and an annular seal for engaging a flange on a head of said bolt.

5. An assembly according to claim 1 wherein said rolled annular edge of said diaphragm comprises an engaging portion facing said open end of said second bore, and said interior surface includes an annular ridge, said engaging portion engaging said annular wall and said annular ridge.

6. An assembly according to claim 2 wherein said rolled annular edge of said diaphragm comprises an engaging portion facing said open end of said second bore, and said interior surface includes an annular ridge, said engaging portion engaging said annular wall and said annular ridge.

7. An assembly according to claim 1 wherein said diaphragm is attached to said body by a threaded fastener.

8. An assembly according to claim 1 wherein said diaphragm is attached to said body by a weld.

9. An assembly according to claim 1 wherein said flange engages said interior surface of said neck portion by a splined connection.

10. An assembly according to claim 9 wherein said flange engages said interior surface of said neck portion by a splined securing ring.

11. An assembly according to claim 10 comprising a seal located between an outer surface of said securing ring and said interior surface of said neck portion.

12. An assembly comprising an outer race of a constant velocity joint and part of a vehicle wheel bearing, wherein the outer race has a first, bore defining a neck portion having an interior surface including an annular wall, and wherein the wheel bearing part has a second bore in which there is received a tubular securing element defining a third bore, the securing element having a flange at one end of said second bore and being swaged outwardly at the other end of said second bore to engage the hub, the third bore defining a central passage and the flange engaging the interior surface of said neck portion, the engaged portion being sealed by a sealing member comprising a body sealingly engaging said central passage and a diaphragm attached to said body said diaphragm including a rolled annular edge sealingly engaging said annular wall.

13. An assembly according to claim 12 wherein an external surface of the securing element and the second bore in the hub have inter-engaging splines and said external surface includes an annular groove in which there is received a seal for engaging said second bore.

14. An assembly according to claim 12 wherein said sealing member body comprises a cylindrical body having an annular groove formed therein, said groove containing a seal for sealingly engaging said central passage.

15. An assembly according to claim 12 wherein said rolled annular edge of said diaphragm comprises an engaging portion and said interior surface includes an annular ridge, said engaging portion engaging said annular wall and said annular ridge.

16. An assembly according to claim 14 wherein said rolled annular edge of said diaphragm comprises an engaging portion and said interior surface includes an annular ridge, said engaging portion engaging said annular wall and said annular ridge.

17. An assembly according to claim 12 wherein said flange engages said interior surface of said neck portion by a splined connection.

18. In an assembly comprising part of a vehicle wheel bearing and a constant velocity joint outer race having a first bore defining a neck portion having an interior surface including an annular wall, and wherein the wheel bearing part has a second bore with an open end and a flange, the second bore defining a central passage, and a sealing member comprising a body, a fastener, and a diaphragm carried on said body said diaphragm including a rolled annular edge, a method of securing together the neck portion in telescopic relationship with the flange by the sealing member comprising:

sealingly engaging said body within said central passage;
   engaging said rolled annular edge of said diaphragm with said interior surface of said neck portion;
   telescoping the neck portion and the flange together; and
   engaging said diaphragm and said body with said fastener and tightening said fastener to draw said neck portion and said flange together.

19. A method according to claim 18 wherein said sealing member comprises a bolt and nut, and wherein engaging comprises securing said diaphragm on said bolt with said nut to draw said neck portion and said flange together.

\* \* \* \* \*